(12) United States Patent
Chen et al.

(10) Patent No.: US 8,079,052 B2
(45) Date of Patent: Dec. 13, 2011

(54) METHODS, APPARATUSES, AND SYSTEMS FOR PRESENTING ADVERTISEMENT CONTENT WITHIN TRICK FILES

(75) Inventors: Michael Chen, Wallingford, PA (US); Bruce R. Bradley, Wayne, PA (US)

(73) Assignee: Concurrent Computer Corporation, Duluth, GA (US)

( * ) Notice: Subject to any disclaimer, the term of this patent is extended or adjusted under 35 U.S.C. 154(b) by 1193 days.

(21) Appl. No.: 10/891,460

(22) Filed: Jul. 14, 2004

(65) Prior Publication Data

US 2006/0080167 A1    Apr. 13, 2006

Related U.S. Application Data

(60) Provisional application No. 60/565,090, filed on Apr. 23, 2004.

(51) Int. Cl.
*H04N 7/173* (2006.01)
(52) U.S. Cl. .................. 725/88; 725/86; 725/102
(58) Field of Classification Search ............... 725/32
See application file for complete search history.

(56) References Cited

U.S. PATENT DOCUMENTS

| | | | |
|---|---|---|---|
| 2001/0039657 A1* | 11/2001 | Fopeano et al. | 725/9 |
| 2002/0097846 A1* | 7/2002 | Jung | 379/88.13 |
| 2002/0144262 A1* | 10/2002 | Plotnick et al. | 725/32 |
| 2002/0191950 A1* | 12/2002 | Wang | 386/46 |
| 2003/0149975 A1* | 8/2003 | Eldering et al. | 725/34 |
| 2003/0200544 A1* | 10/2003 | Ellis et al. | 725/46 |
| 2004/0003398 A1* | 1/2004 | Donian et al. | 725/34 |
| 2004/0103429 A1* | 5/2004 | Carlucci et al. | 725/32 |
| 2005/0216932 A1* | 9/2005 | Danker | 725/32 |

OTHER PUBLICATIONS

Search Report and Written Opinion for PCT/US2005/013912. Please note that the Search Report does not list the references cited therein. Applicant searched the WIPO website and failed to find the references. As such, the search report and written opinion is included without a detailed listing of references, as Applicant has been unable to ascertain details of what references were cited.

* cited by examiner

*Primary Examiner* — Justin Shepard
(74) *Attorney, Agent, or Firm* — Philip H. Burrus, IV

(57) ABSTRACT

Methods and apparatuses and systems for inserting advertisement segments into trick content. Advertisement segments present in the original video content are extracted from the video content and merged with other navigation segements to generate associated trick content. The advertisement segment may be inserted into the trick files may be displayed at their normal playback speed, a different apparent playback speed, or displayed in a different direction. Additionally, alternative content of the advertisement segment may be inserted into the advertisement segment to provide specialized versions of the advertisement content to be displayed in trick content mode, or the content may be completely different fro the original advertisement content, such as session specific advertisement content or even user specific advertisement content based on user preferences.

139 Claims, 10 Drawing Sheets

METHODS, APPARATUSES, AND SYSTEMS FOR PRESENTING ADVERTISEMENT CONTENT WITHIN TRICK FILES

CROSS REFERENCE TO RELATED PATENT APPLICATION

This application claims priority under 35 U.S.C. §119 to U.S. Provisional Patent Application Ser. No. 60/565,090, entitled "Method, Apparatus, and System for Presenting Advertisement Content Within Trick Files," filed on Apr. 23, 2004.

TECHNICAL DESCRIPTION OF THE INVENTION

The present invention is directed to generating trick-play files and more particularly to a method, apparatus, and system for including advertisement content within trick files used in narrowcast video presentation environments.

BACKGROUND

Trick files are precompiled files used in narrowcast systems to implement trick mode playback such as fast-forward and rewind in an efficient fashion. Fast-forwarding and rewinding are generally accomplished by playing precompiled trick files at normal speed in place of the normal playback file. The known technique of playing the normal playback file at a higher rate of speed utilized by devices such as cassette players and VCRs is not an ideal or efficient choice when servicing multiple users, since it places significantly higher demands on the components in the system. Instead, the trick files are played at normal speed but appear to be at a different speed because the trick files are composed of a subset, for example every other complete frame, of the normal file. The dominant narrowcast application is the delivery of content on demand (COD). This content may span many categories, including movies on demand (MOD), video on demand (VOD), subscription video on demand (SVOD), free on demand (FOD) and network-based digital video recording (NDVR).

Narrowcast programming is point-to-point streaming of video from a storage point in the network to a specific subscriber. Narrowcast applications are made possible by compression techniques, e.g., the standards developed by the Moving Picture Experts Group (MPEG), that enable more content to be delivered to viewers with little or no degradation in picture quality. The resulting increase in transmission capacity allows narrowcast programming to be placed alongside broadcast programming for delivery to viewers.

Narrowcast applications are further enabled by the installation of digital television networks that enable two-way communication so that a subscriber can interact or "request" information from the network equipment. A standard example of such interaction is a request to fast-forward or rewind a piece of content being viewed. This interactivity is an essential feature of interactive narrowcast applications.

However, when allowing fast forwarding or rewinding of recorded content that includes advertisements and other advertisement content ("advertisements"), the advertisements are effectively lost because current COD implementations are oblivious to advertisements. The COD system will generate trick content in normal fashion, i.e., selecting certain frames for inclusion in the precompiled trick content. As a result, the advertisements may be represented by a subset of video frames that are not indicative or typical of the advertisement. This is problematic because playing content without the proper advertisements may upset the revenue model for the cable companies or violate contractual obligations with advertisers.

Thus, there is a need to allow customers unhindered navigation through COD material (i.e., fast-forward and rewind) while maintaining the effectiveness of advertisements encountered during trick plays or to, alternatively, insert new advertisements into the trick content.

SUMMARY OF THE INVENTION

Generally described, the invention includes methods, apparatuses, and systems for displaying advertisements when a trick file is played. This may be accomplished by inserting advertisements into trick content or accessing advertisements via a play list when in trick play mode. A simple implementation replicates the advertisements present in the original content at their normal playback speed within the associated trick content. Alternatively, the advertisements inserted into the trick content may be such that when the trick file is played the advertisement is displayed at a different apparent playback speed (for example, half-speed when compared to the trick play rate) as compared to the other content; may be such that when the trick file is played the advertisement is displayed in a different direction (i.e., forward while the user is in rewind mode); may be specialized versions of the advertisements, may be completely new advertisements; or may be session specific or even user specific. Alternatively, the system treats each piece of content as a distinct segment such that when a trick file is requested, a segment in trick mode is displayed followed by another segment that could be an advertisement followed by another segment in trick mode until the user is at the desired location within the content. The playback (normal or trick) sequence would be governed by a play list. By doing this, it becomes impossible to skip the advertisements via trick play, since whether in normal or trick play, the advertisements will be played back as predetermined.

The various aspects of the present invention may be more clearly understood and appreciated from a review of the following detailed description of the disclosed embodiments and by reference to the appended drawings and claims.

DETAILED DESCRIPTION OF THE EMBODIMENTS

Figure 1:
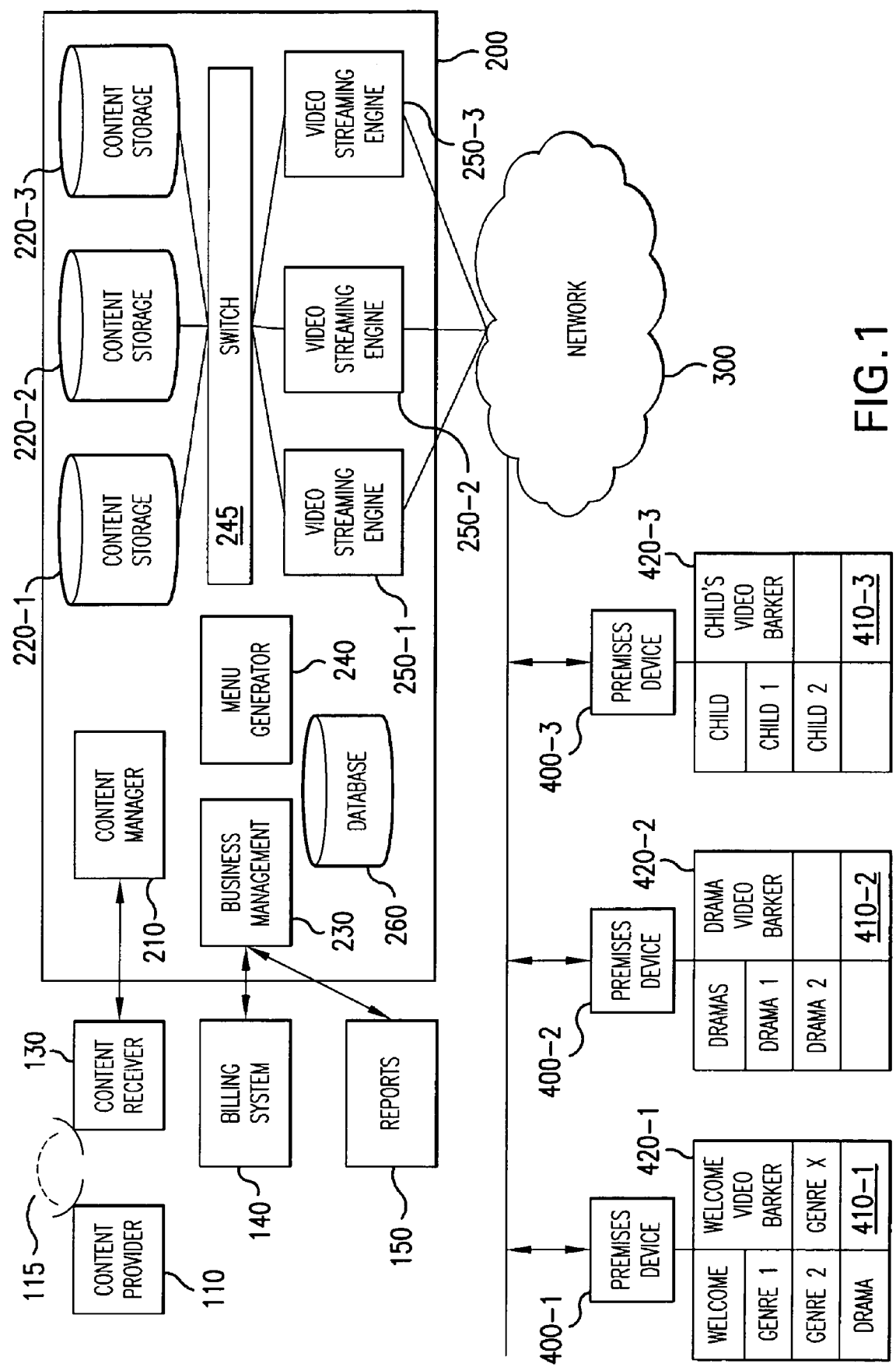
FIG. 1 illustrates a server network system in which the invention may be implemented, in accordance with some embodiments of the present invention.

FIG. 1 illustrates a content on demand (COD) server network system 200 in which the invention may be implemented, in accordance with some embodiments of the present invention. For purposes of this application the COD server network system 200 will be described in terms of a video on demand (VOD) server network systems 200. Those skilled in the art will appreciate that the VOD server network system 200 is not limited to a VOD server network system, but may encompass any of multiple systems including, but not limited to, movies on demand (MOD), video on demand (VOD), subscription video on demand (SVOD), free on demand (FOD) and network-based digital video recording (NDVR), and the like without departing from the scope of the invention. In the system shown in FIG. 1, one or more content provider(s) 110 provide content to the VOD server network system 200 in various formats via various communication means 115. For example, in a typical digital VOD system, the content is typically in the form of a single-service MPEG-2 transport stream. The VOD server complex 200 may receive the source content through RF signals by satellite, ATM data from ATM networks, local feeds and other information via terrestrial link. The content provider 110 may also provide the source content by tape, DVD, or any other desired and suitable media. The source content received by the VOD server complex 200 may also include trick files as well as normal playback source content.

The source content is received by a content receiver 130 and sent to the content manager 210 in the VOD server complex 200. The content receiver 130 may be part of the VOD server complex 200 or may be an independent device that receives source content from the content provider 110 and then forwards the source content to the VOD server complex 200. In the VOD server complex 200, the source content may be processed and reformatted as necessary. For example, source content may be received in digitally compressed format, demultiplexed by a demultiplexer (not illustrated) and stored in any convenient format or formats, such as MPEG or MPEG-2. It will be appreciated, however, that the present invention is not limited to these formats.

The reformatted content is stored on the content storage devices 220-1 ... 220-n. Each of the content storage devices 220-1 ... 220-n may include a disk array, such as a Just a Bunch of Disk "JBOD" or a redundant array of inexpensive disks "RAID". The source content may be stored in an encrypted format and then may be streamed in an encrypted format via a network 300 to premises devices 400-1 ... 400-n. Alternatively, the source content may be encrypted as each session is streamed.

The VOD server complex 200 may include a central processing unit (CPU) or other processing device (not shown) and a relational database management system (RDBMS) 260. The RDBMS 260 functions as a server or storage device and has appropriate software and storage devices. The storage devices of the RDBMS 260 contain a listing or table of one or more of the following: the content providers 110, the subscribers or the premises devices 400-1 ... 400-n, the servers upon which the content is located, the orders, the purchase history of each subscriber or the premises devices 400-1 ... 400-n, the content files, metadata related to the content files, and data regarding the usage (demand) of the content. The RDBMS 260 is managed by a business manager 230 which additionally may interface with a billing system 140 to provide billing information to the billing system for the system operator. The business manager 230 may also provide reports 150 regarding the operation of the server complex. In addition, the business manager 230 may maintain an authorization system (not shown) that contains information on the features, privileges, benefits, bonuses, space, tiers, etc., available to each customer and/or to each content provider. The authorization system may be external or may be included within another server, such as part of the RDBMS 260. Thus, when a customer requests content, the system queries the business manager 230 to determine whether or not the subscriber is authorized to receive the content. If so, then the request may be approved. If not, then the request may be denied. Likewise, if a content provider 110 wishes to store a movie, that request may be granted, denied, or granted only with certain restrictions, such as to size or location. The RDBMS 260 further captures every viewing event by each premises device identification, customer code, personal identification number (PIN) or similar identification data.

According to one embodiment, the customer may request a program via a premises device 400-1 ... 400-n, such as, but not limited to, a set-top-box, personal computer, lap-top, personal digital assistant, cellular phone or the like. The request is sent over a distributed interactive network 300. The distributed interactive network 300 may be any type of network capable of transferring data electronically, such as, but not limited to, cable networks, the Internet, wireless networks, Telco networks, or satellite networks. For ease of explanation, this description shall use the terminology for a cable network, but the present invention can be implemented on other types of networks even though the terminology might be different.

A request for content sent by a user from a premises device 400-1, ... 400-n is received by the server complex 200 and processed by the business manager 230. If authorized, the business manger 230 prompts the video stream engine 250-1, ... 250-n to send the requested content to the premises device 400-1, ... 400-n. The content is sent via network equipment that provides the managing, processing, and modulation, as appropriate, for the delivery of the video content across the network to the premises device 400-1 ... 400-n.

During the reformatting process, trick content is created. The trick content is created by extracting navigation frames, or segments (e.g., a subset of video keyframes; for MPEG-2 video, typically full intra or I-frames) from the portion of the content being processed and reformatted for continuous playback. This reformatting includes altering program clock reference (PCR) values and both presentation time stamp (PTS) and decode time stamp (DTS) values to be consistent with the new frame composition of the generated file. Trick content may also be generated so that the trick content includes non-keyframes, by selecting whole groups of pictures (GOPs) for inclusion instead of keyframes. It is also possible to generate trick content by more brute-force mechanisms, i.e., by encoding the video image of a tape deck fast forwarding through the content, as long as the correspondence between trick content and normal playback file locations can be determined.

For trick content, the source content locations are matched with their corresponding new positions, and this correspondence is recorded in an index file for future use. The index file is used as a reference tool to position the program in the proper position as the user moves from the normal file to the trick file and vice versa. For example, when a user is at point "c" in a movie and wants to fast-forward, the starting point for the fast-forward trick file must be point "c1" which corresponds to the same display time as point "c" in the movie. Point "c1" is determined from point "c" by reference to the index file. Similarly, when the user fast-forwards to point "g1" in the trick file and pushes "play," the normal file begins playback at point "g" by referencing the index file. Although it is possible to embed the indexing information within the trick content itself, this is typically less optimal from a performance standpoint, and as such is not commonly done.

The trick play may be accomplished via one trick file that has the complete program, including advertisements, or via a play list associated with the program content. The play list embodiment may be accomplished by assigning discrete portions of content to a program. When the program is requested, each portion is played out to the user. For example, "Friends" (a 30 minute episode) might be composed of several portions such as 1 (the intro), 2 (first advertisement), 3 (second advertisement), 4 (third advertisement), 5 (first 3 minutes of programming), 6 (next 3 minutes of programming), 7 (next 3 minutes of programming), 8 (next 1 minute of programming), 9 (fourth advertisement), 10 (fifth advertisement), 11 (sixth advertisement), 12 (seventh advertisement), 12 (next 3 minutes of programming) etc . . . The play list associated with this program would instruct the VOD server complex 200 to play the portions of content in the prescribed order. When the user requests a trick file, the play list could still be utilized but the trick version of each portion of content would be played. Further, in playing out the trick version of each portion of content, the business manager 230 could determine, based on multiple variables, to play the trick mode version of an alternative advertisement or play the advertisement in a different manner as further discussed herein.

The present invention calls for the addition of an advertisement detector/extractor unit. Many possibilities for advertisement detection/extraction exist, ranging from automatically detecting certain properties of the audio and/or video content at advertisement boundaries such as black frames, analog or digital cue tones, silences or volume changes to having a list of the advertisement boundaries that is either generated when the content is edited and/or spliced together, or experimentally determined by a viewer watching the content and looking at a stopwatch. Although automated solutions are clearly preferable for VOD systems, manual entry techniques such as those used to create databases of TV program guide listings demonstrate that automation is not a requirement for implementation of this functionality.

The advertisement detector/extractor unit may be added prior to or in parallel to keyframe detection, in order to avoid missing cases where the advertisement cannot be detected from keyframes alone. It is possible to drive the advertisement detector with external and/or non-real-time information, e.g., a manually generated list of timestamps or program clock references.

When an advertisement is detected, a simple implementation of the proposed improvement replaces the extraction of keyframes and selection of navigation segments with injection of the advertisement segments or substituted content into the trick content being generated. This causes the original content location to be associated via the index file with the advertisement or substituted content in the trick content, and so it will be observed in trick play that corresponds to that location.

Note that if a reverse trick file is being built the advertisement or replacement content may be substituted or inserted so that it appears in correct forward order within the reverse trick file. This implies that whether forwarding or reversing over the content, the advertisement or replacement content will appear in its originally intended manner. However, the inserted advertisement content could be designed to appear to be in reverse while still enticing the viewer to purchase the advertised product. There are several methods for inserting advertisement content into the trick content. These include inserting the normal advertisement; inserting an advertisement shown at different speeds; inserting an advertisement where the direction of the advertisement is changed; inserting specialized versions of the advertisement, inserting a new advertisement, and inserting a user or session specific advertisement. Each of these methods is discussed below.

Inserting Normal Advertisements in Trick Content

When the trick content is being created and an advertisement is detected, rather than continuing generation of the trick content via the method described above, the entire content of the advertisement may be inserted into the trick content, rather than segments of the advertisement. Thus, when the trick file is viewed, each advertisement in its entirety may be displayed at its normal speed. This effectively prohibits the user from fast-forwarding or fast rewinding through the advertisements.

Inserting Advertisements Shown at Different Speeds

Trick files may be created so that the non-advertisement content is displayed at a different apparent playback speed than the advertisements. An example of this would be generating fast forward trick content using an apparent playback speed of roughly 8× for non-advertisement content, but slowing the apparent playback speed to 4× for advertisements. This can easily be generalized to allow different speeds for various portions of trick content.

Direction of Advertisement Changed

With different trick content built to support different trick play modes, e.g., forward and reverse, or fast and faster, modifications to the simple implementation can be made to alter behavior based on the trick play mode being generated. For example, alternative advertisements may be made available for different trick play speeds; advertisements may be included in the forward direction, but omitted from the reverse direction; etc. Or, the advertisements could be played within the trick file in a different manner, such as forward within a rewind trick file.

Specialized Version of the Advertisement Content

Alternatively, when the trick content is generated, instead of copying the advertisements, alternative content, related or unrelated to the original advertisements, may be selected for insertion into the trick content. The substituted content could be a condensed version of the advertisement (perhaps a still frame representation of the advertiser and/or product) to provide the illusion of fast navigation; a different advertisement; or an advertisement blended with other possibly useful information such as rating advisories, and the like.

Alternatively, the trick content could be generated to include advertisements in a different fashion. For example, the trick files could letterbox the advertisement, present advertising banners, or the advertisement could be scaled and placed as if it were in a barker window such that the trick file could be displayed in one half of the screen and the advertisement in the other half of the screen.

Alternatively, the trick content may be generated with audio advertisements with or instead of advertisement segments. In such a case, while the trick content is displayed, the audio content would be played. The audio advertisements may be the audio version of the advertisements in the content for which the trick file is being played or may be different, unrelated advertisements. The audio content requires reformatting as described above.

User or Session Specific Advertisements

When a customer requests content such as a trick file, the VOD server complex 200 may determine the identity of the premises device and/or a user requesting the content, as this information is contained in the up stream request. Based on the identity information, the business manager 230 can query the RDBMS 260 to determine the past viewing of the premises device 400-1 . . . 400-n and/or the user. If the locations of advertisements in generated trick files either are known in advance or can be inferred, then the VOD server complex 200 may use session-specific parameters or associated memory to generate customized trick play behavior for each session, e.g., if you have seen an advertisement once during a session, the system skips over it for the rest of the session. Other customized behaviors may also be defined. This concept may be generalized to personalized settings rather than anonymous session-specific parameters and associated memory, if the VOD server complex 200 has access to personalized information.

Alternatively, based on the past viewing, the RDBMS 260 can determine the best advertisements to send to the user for playing during trick mode play. The customer's identity may be further refined via reference to a personal identification number ("PIN") or identity code keyed in by the customer.

While the terms "user," "subscriber," and "customer" are used interchangeably in this description, it should be appreciated that targeted images may be created for delivery to users, whether or not those users are the actual subscribers or customers. There may be multiple users for a given subscription. Thus, for example, each user of a premises device may have his or her own PIN, and individual user preferences may be maintained for each PIN.

Figure 2:
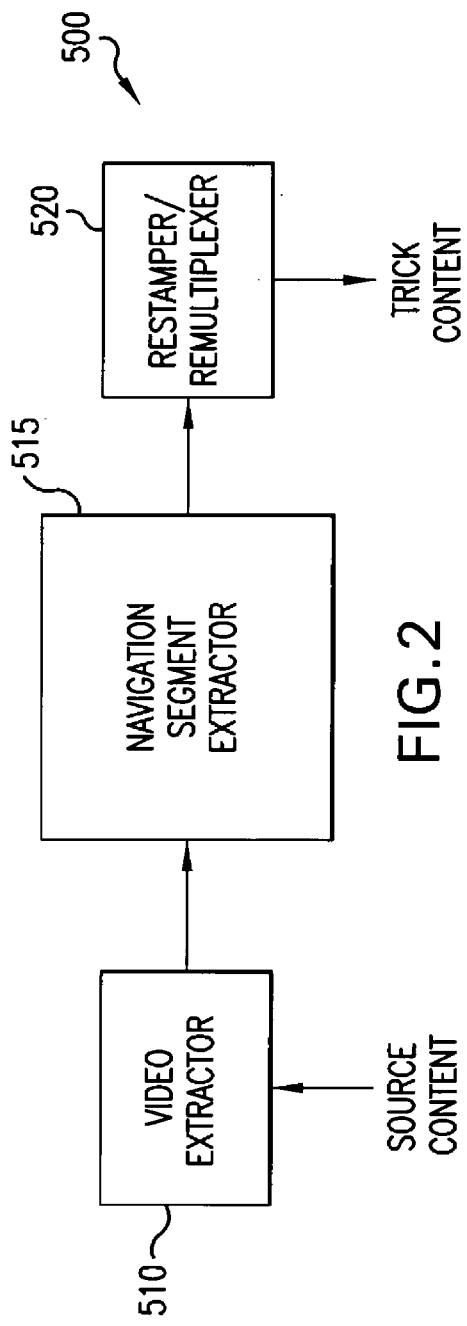
FIG. 2 illustrates a trick content generator in accordance with some embodiments of the present invention.

FIG. 2 is a block diagram illustrating a typical trick content generator 500 located within the content manager 210 in the VOD server complex 200. When the source content, which may be formatted as MPEG-2 transport stream, is forwarded to the content manager 210 from the content receiver 130, the source content is delivered to a video extractor unit 510. The video extractor unit 510 extracts the video portions from the source content and stores the corresponding location of the video content portion as it appears in the source content. Typically, the video extractor unit 510 may extract those packets that contain the proper packet identifier (PID) value associated with video content. The video extractor unit 510 may automatically determine the appropriate PID values from other information contained in the source content. For example, the video extractor unit 510 may examine the program-specific information (PSI) file within the source content to determine the PID values to identify the location of the appropriate video content. Alternatively, the video extractor unit 510 may use a well-known value, or may receive the desired value from a third party (not shown) to identify the appropriate PID values.

Typically, the byte or packet counts may be used to represent the corresponding locations of the packets within the source content. Therefore, as the packets from the transport stream pass through the video extractor unit 510, the video extractor unit 510 may maintain a running tally of the number of packets or bytes. For example, as the transport stream passes through the video extractor unit 510, the video extractor unit 510 examines the PID values for each packet and extracts each packet that contains video content. Meanwhile, a counter within the video extractor unit 510 maintains a count on the number of packets being examined. When a packet is extracted from the transport stream, the value of the counter may be associated with the extracted packet. This allows the packets containing video content to be assembled in the appropriate order. Typically, the counter will be reset each time a new transport stream is received.

The video extractor unit 510 then forwards the extracted video portions of the source content with their corresponding relative locations within the source content to a navigation segment extractor unit 515. The navigation segment extractor unit 515 identifies and removes navigation segments from the received extracted video segments. Additionally, the navigation segment extractor 515 retains the association of the relative location of each extracted navigation segment within the original source content. The navigation segment extractor unit 515 then forwards the extracted navigation segments and their corresponding indexed locations from the original source content to a restamper/remultiplexer unit 520.

The restamper/remultiplexer unit 520 performs a restamping and remultiplexing operation on the navigation segments received from the navigation segment extractor unit 515 to generate a trick file. Typically, the restamper/remultiplexer unit 520 restamps the program clock reference (PCR), the presentation time stamp (PTS), and the decoding timestamp (DTS) values within the transport stream packets. The restamped packets may then be remultiplexed with other packets, such as the PSI packet. The restamper/remultiplexer unit 520 may also combine the original location associated with each of the of the navigation segments with the trick contents to produce an index content. Although the restamping and remultiplexing functions are described as being performed by a single device, the restamper/remultiplexer unit 520, it should be understood that the restamping and remultiplexing operations may be performed by separate devices at different times. The index content may be used to identify the appropriate location of the appropriate trick content. The resultant trick content and trick index content is combined in a trick file, which may be ready for subsequent distribution, propagation, and playback by premises devices 400-1 . . . 400-n.

The video extractor unit 510, the navigation segment extractor unit 515, and the restamper/remultiplexer unit 520 may typically be embodied as software applications that are executed by a processing unit (not shown) on the content manager unit 210. In one embodiment, the software applications for the video extractor unit 510, the navigation segment extractor unit 515, and the restamper/remultiplexer unit 520 may be stored on a single server, which allows the transferring of the extracted content to be affected through local memory connections, or as storage network connections. Alternatively, the individual software applications, the software applications for the video extractor unit 510, the navigation segment extractor unit 515, and the restamper/remultiplexer unit 520 may be stored on separate servers over a distributed network. The transfer of extracted content may occur through standard network connections.

Figure 3:
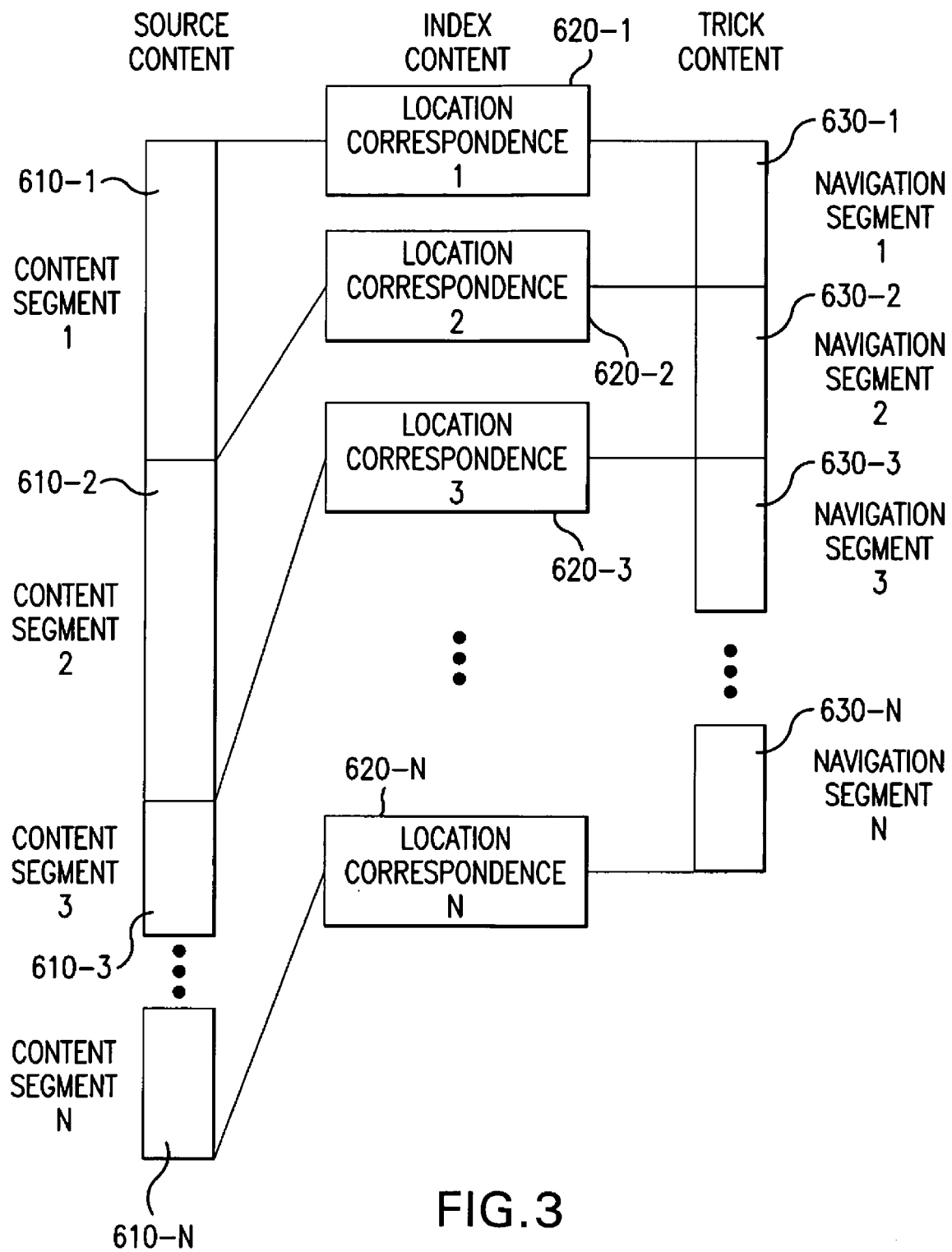
FIG. 3 illustrates the correspondence between source, trick, and index content in accordance with some embodiments of the present invention.

FIG. 3 is a block diagram illustrating the correspondence between source content 610, the index content 620, and the trick content 630 in accordance with an exemplary embodiment of the present invention. The source content 610 contains a number of content segments 610-1 . . . 610-n, which contains the content for the trick content. Each of the content segments 610-1 . . . 610-n has a corresponding location within the source content 610 that identifies the location of the particular content segment within the source content 610. The location correspondence is maintained through the index content 620. Thus, when the content segments 610-1 . . . 610-n are converted to navigation segment 630-1 . . . 630-n, their relation to one another is maintained through the index content 620.

Figure 4:
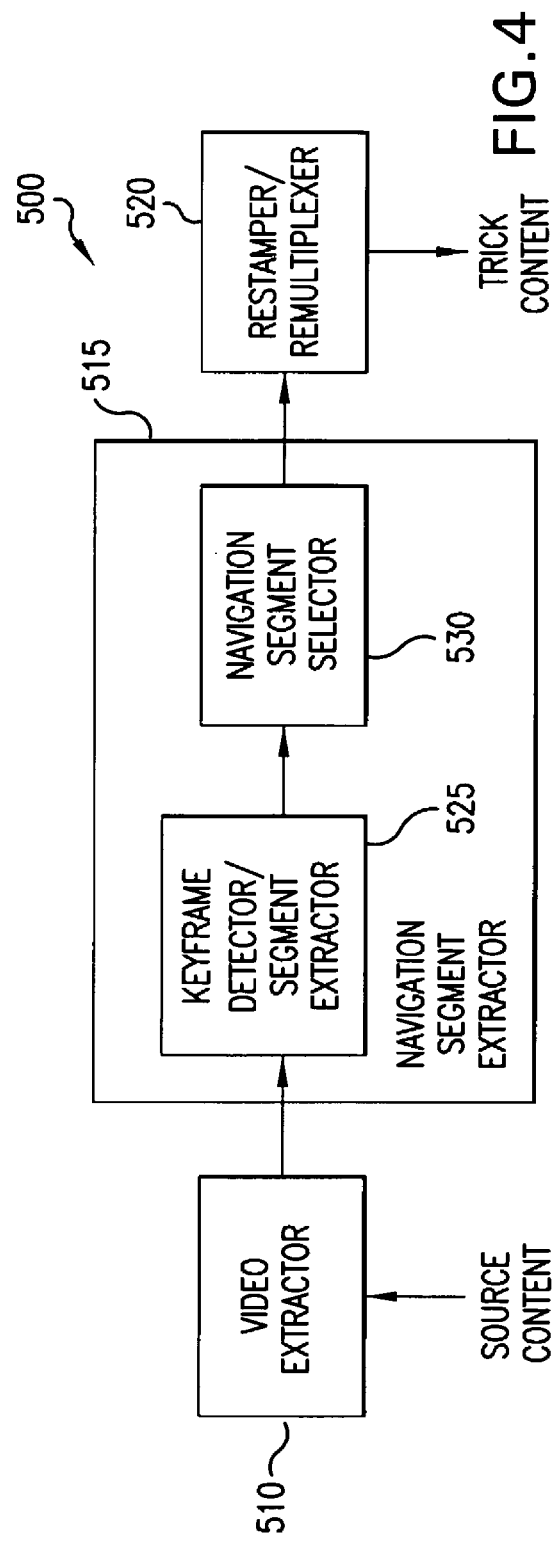
FIG. 4 illustrates a navigation segment extractor in accordance with some embodiments of the present invention.

FIG. 4 is a block diagram illustrating a navigation segment extractor unit 515 that may be used in conjunction with some embodiments of the present invention. The navigation segment extractor unit 515 may contain a keyframe detector/segment extractor unit 525 and a navigation segment selector unit 530. Typically, the source content may be in the form of compressed video, which uses predictive technique to eliminate coding redundant data. Video frames encoded using prediction must rely on information from other frames to be decoded properly. However, at the start of each sequence of video frames, there are no prior frames to help decode the first frame of the video sequence. This first frame is what is referred to as keyframe data. The remaining data within the video sequence is known as non-keyframe data. The non-keyframe data is interpolative data that relies on the keyframe data of the video sequence and the keyframe data of the subsequent video sequence to produce a smooth animated video playback.

Figure 5:
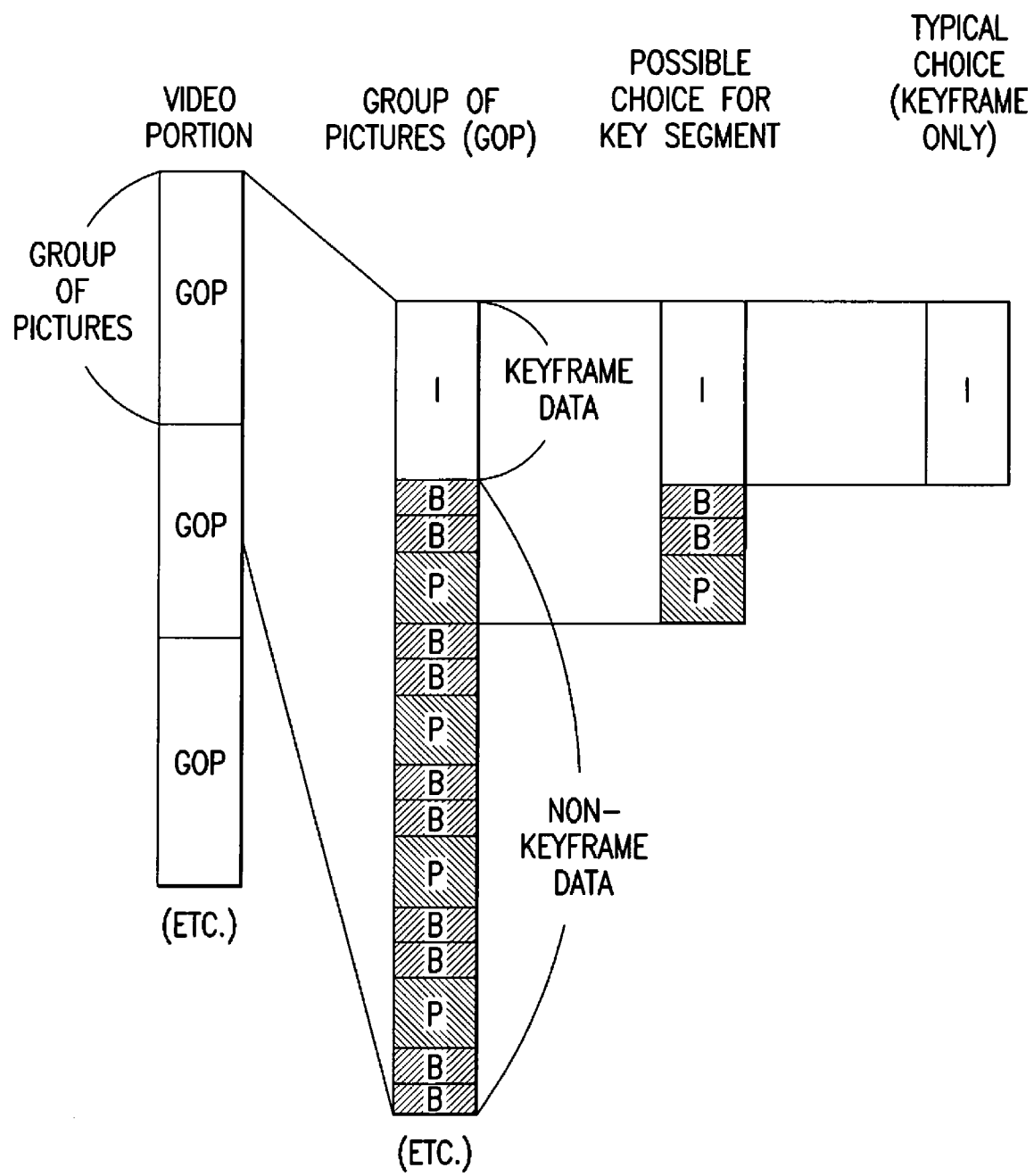
FIG. 5 illustrates content video internal structure in accordance with some embodiments of the present invention.

Typically, the compressed video portions of the source content is composed of smaller items known as groups of pictures (GOPs). Each GOP begins with keyframe data and may have interpolative non-keyframe data. A key segment is a subset of data that may be suitable for use as a navigation segment. Each key segment should start with keyframe data to insure that the trick file can be randomly accessed. Thus, the minimal key segment of the trick content is the keyframe data. However, the key segment may also include additional interpolative non-keyframe data that follows from the same GOP. Alternatively, the key segment may also include portion from a successive GOP. The relationship between the video content and the key segment is shown in FIG. 5.

The video portions, which contains the GOPs, and their corresponding location within the source content is passed from the video extractor unit 510 to the keyframe detector/segment extractor unit 525 within the navigation segment extractor 515. The keyframe detector/segment extractor unit 525 examines the video content and identifies each GOP and identifies the keyframe data in each GOP. Once the key segments for each GOP, both for program content and the advertisements are passed to the navigation segment selector unit 530, the navigation segments may be extracted.

As the key segments are extracted, the location of the keyframe data within the original source content is also recorded and associated with the key segments. The keyframe detector/segment extractor unit 525 then passes the key segments and the corresponding location information to a navigation segment selector unit 530. The navigation segment selector unit 530 identifies certain navigation segments for inclusion within the trick content, while maintaining the location of the navigation segments within the original source content. The navigation segments typically thus include segments from both program content and the advertisements. The navigation segments along with their corresponding locations within the original source content are then passed to the restamper/remultiplexer unit 520, where they may be converted to a trick file, as described above Alternatively, rather than selecting key segments, the navigation segment selector unit 530 may generate navigation segments from the data comprising the key segments, such as, but not limited to, in MPEG encoded content I and P frames from the original GOPs.

Alternatively, the navigation segment selector unit 530 may generate navigation segments by analyzing the frames within the key segments to detect scene changes. When a scene change is detected on a P frame, the navigation segment selection unit 530 may decode and re-encode the sequence of frames such that an I frame contains the sequence which represents the same image as the P frame in which the scene change was detected.

For example, with MPEG transport, GOPs may be composed of 15 pictures or frames with the first frame being an I frame. Assuming this construction of the video stream, a simple way to produce a fast-forward trick content would be to extract the first of every 15 frames, so the navigation segments would be frames 0, 15, 30, 45, 60, 75, 90, 105, and so on. Furthermore, suppose an advertisement begins at the $30^{th}$ frame and ends at the $74^{th}$ frame. In this case, the advertisement would have a length of 44 frames, which would span the third, fourth, and fifth navigation segments ("advertisement segments".)

Figure 6:
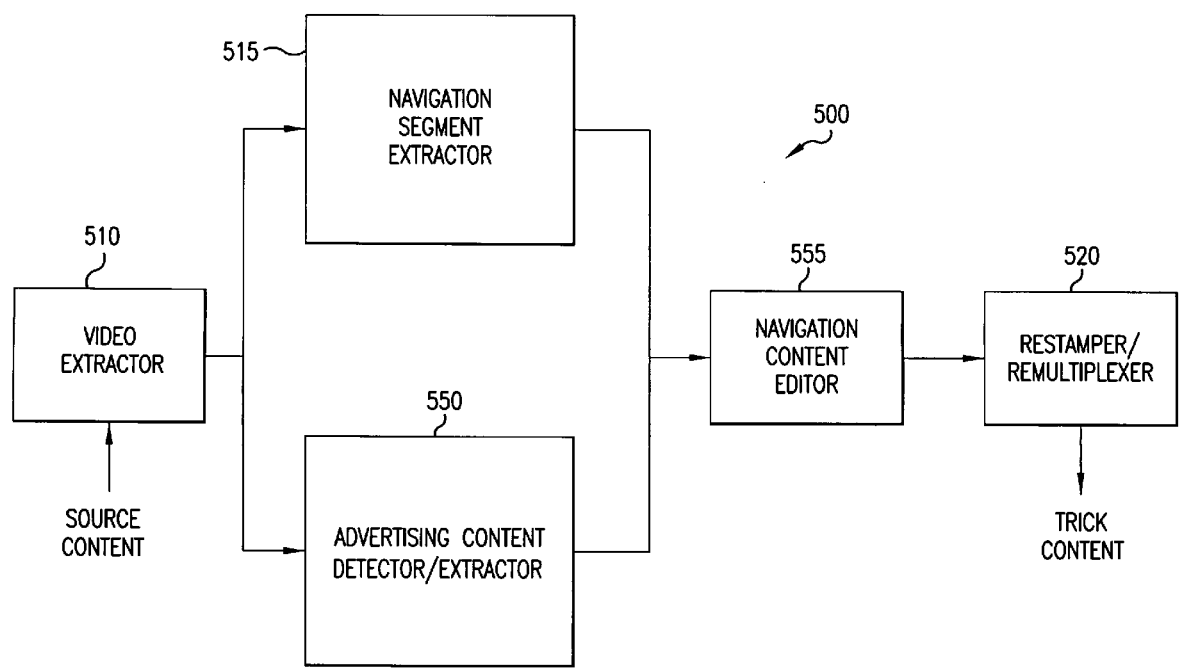
FIG. 6 illustrates advertisement support modifications in accordance with some embodiments of the present invention.

FIG. 6 is an illustration of a trick content generator 500 modified for supporting the placement of advertisement content in trick content. Typically, navigation content may include portions of advertisement content, since current technology does not differentiate advertisements from program content. In such cases, the navigation segments extracted from advertisements ("advertisement segments") contained in the trick content are so limited that the message of the original advertisement is lost. The modified trick content generator 500 comprises an advertisement detector/extractor unit 550, which examines the source content to identify the advertisement content. The advertisement content may be identified in several ways known in the art. If an advertisement is detected, the advertisement in its entirety is extracted and the corresponding location of the advertisement in the source content is noted. Thus, the navigation segments that are extracted by the navigation content extractor unit 515 that contain advertisement content may be identified.

It should be recognized that whenever an advertisement is inserted into trick content, regardless of the manner of doing so, the advertisement may also have synchronized audio as well as video. The synchronized audio may be included with the inserted advertisement. For this reason, advertisement content detector/extractor should have access to the source content for detection and extraction. The advertisement segment may be composed of video alone, audio alone, or video and audio.

The advertisement segment and its corresponding location within the source content are then passed to the navigation content editor unit 555, which performs editing operations on the navigation content, as appropriate. Navigation segment content editor unit 555 may (1) insert an advertisement (2) append to the advertisement segment the remainder of the advertisement content corresponding to the advertisement segment, or (3) replace the advertisement segment with either the advertisement in its entirety or an alternative advertisement.

Figure 7:
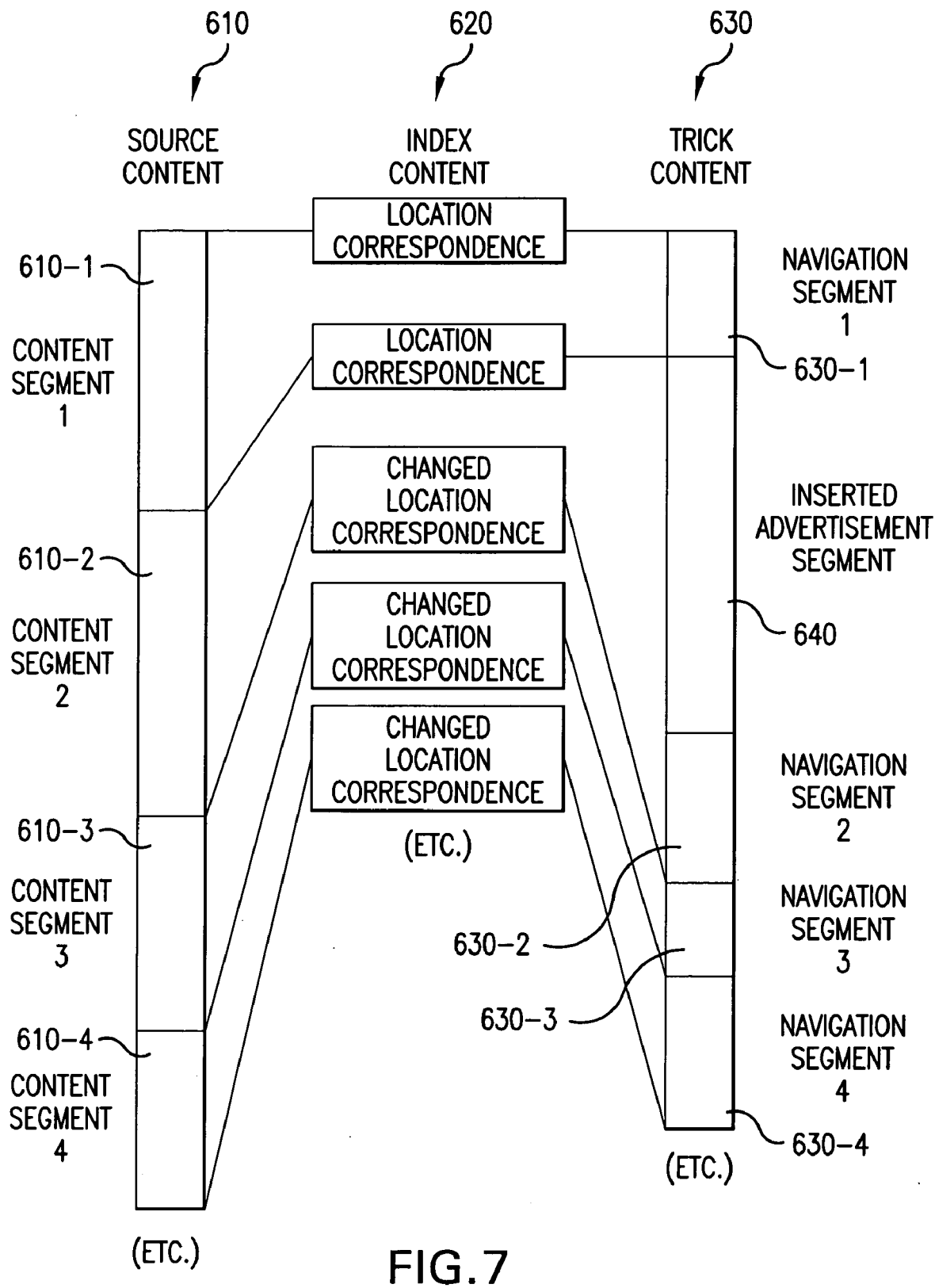
FIG. 7 illustrates content correspondence with ad insertion in accordance with some embodiments of the present invention.

If it is determined that an advertisement is to be inserted, the navigation content editor unit 555 would simply insert the advertisement between navigation segments. An example of inserting an advertisement into the trick content 630 is illustrated in FIG. 7. For purposes of this discussion, a navigation segment that contains advertisement content will be called an "advertisement segment." In the example, an advertisement segment 640 has the same corresponding location within the source content 610 as the second navigation segment 630-2. The second navigation segment 630-2 is appended to the inserted advertisement segment 640 in the trick content 630 so that the advertisement segment 640 will appear prior to the second navigation segment 630-2. The corresponding locations of the subsequent navigations segments, 630-3, 630-4, etc. have been changed due to the addition of the advertisement segment 640 to the second navigation segment 630-2. In the example, the corresponding changed locations 630-1, 630-2, and 630-3 may be increased to account for the insertion of the advertisement 640.

The navigation content editor unit 555 further may identify navigation segments extracted from the advertisements by the navigation content extractor unit 515. The navigation content editor unit 555 may then remove those navigation segments because they would be duplicative with the navigation segments associated with the inserted advertisements inserted or the navigation segments may be no longer necessary or economical. By doing so, the navigation content editor unit 555 would further optimize the creation and presentation of trick files.

However, if it is determined that the advertisement corresponding to an advertisement segment should be inserted within the trick content 630, then at least one advertisement segment is identified that has the same corresponding location as the advertisement to be inserted. For the particular advertisement segment with the same corresponding location within the source content as the preserved corresponding location of the advertisement, the advertisement may be appended to that particular advertisement segment. Then the advertisement segment to which the advertisement was appended is then removed, since that particular advertisement segment is now represented by the advertisement. Further, once the location range for the advertisement is determined, the navigation content editor unit 555 may remove any navigation segments whose corresponding locations lie within the calculated location range specified for the particular advertisement. Considering the prior example where every $15^{th}$ frame is selected as a navigation segment and an advertisement spans frames 30 to 74, the advertisement would be appended to frame 30 and then frames 30, 45, and 60 would be removed from the trick content. The navigation segments and the advertisements are then merged and sorted into a trick file.

Figure 8:
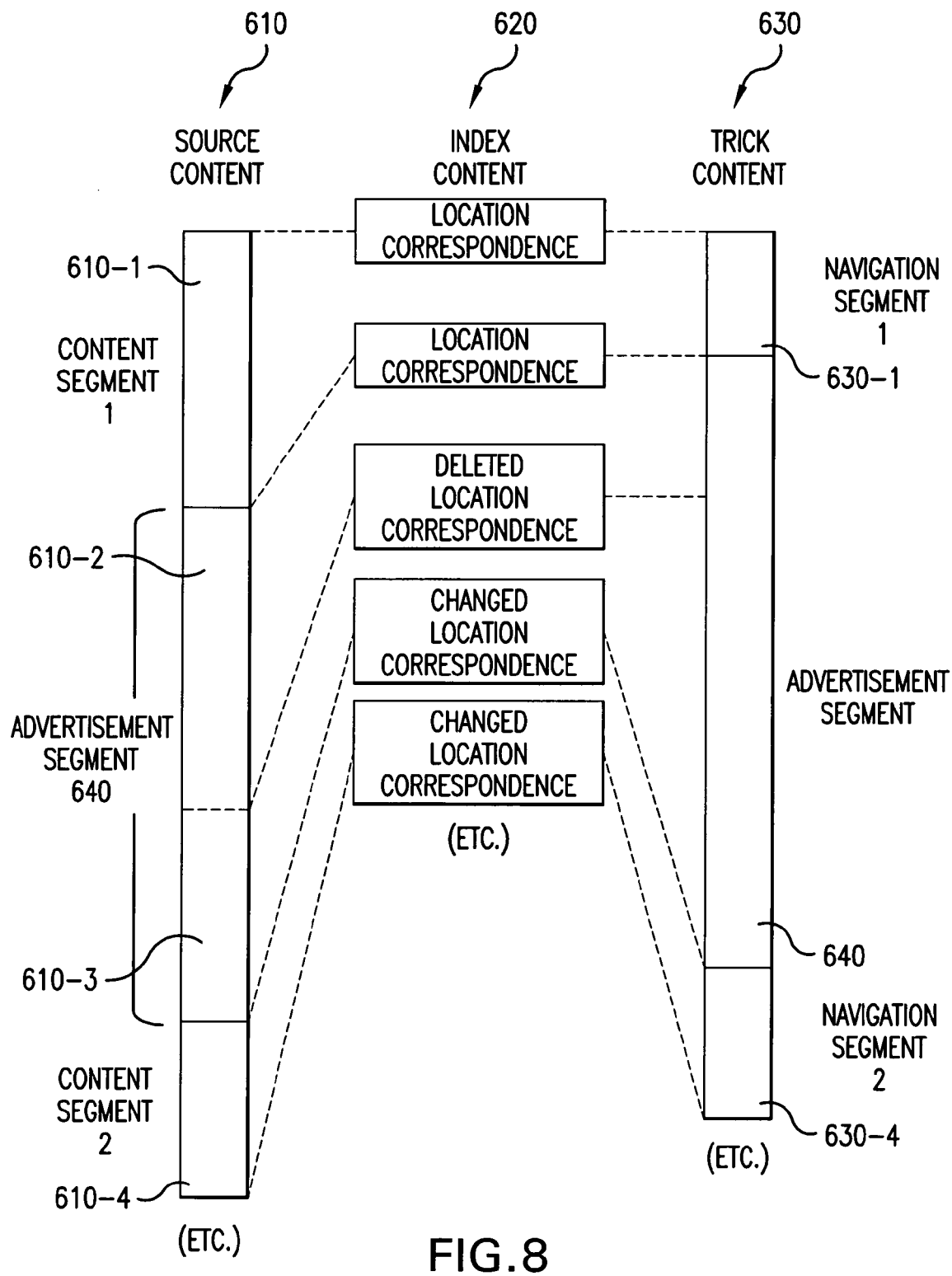
FIG. 8 illustrates content correspondence with ad preservation in accordance with some embodiments of the present invention.

Alternatively, rather than appending the advertisement to an advertisement segment, the advertisement segment may simply be removed and the advertisement inserted in its place. Likewise, all other advertisement segments duplicative of the advertisement would also be removed. FIG. 8 illustrates an example of preserving the advertisement segment 640 identified in the source content 610 and placing it in the trick content 630. In the example, the advertisement segment 640 is identified to have the same corresponding location within the source content 610 as the second content segment 610-2 and the third content segment 610-3 (FIG. 3). The location range of the advertisement segment 640 is determined to encompass both the second and third navigation segments 630-2 and 630-3, respectively, of the trick content. Therefore, these navigation segments 630-2 and 630-3 are removed from the trick content 630. The second location correspondence from the source file is replaced with an identical correspondence location that corresponds to the advertisement content 640. Furthermore, the location of the navigation segments that follow the advertisement segment 640 may be changed due to the difference in size between the advertisement segment 640 and the second navigation segment 630-2 and the third navigation segment 630-3.

Lastly, if the determination is made that the advertisement segment should be replaced, then the navigation content editor unit 555 may preserve the corresponding location of the advertisement segment. The advertisement segment is then replaced with the alternative advertisement content in it entirety. The navigation content editor unit 555 may further remove any additional advertisement segments related to the first advertisement segment removed. If this is not done, the trick content would contain both a new advertisement as well as advertisement segments from the replaced advertisement. This can be accomplished by reference to the location range of the advertisement within the video source content from which the first advertisement segment was derived. All advertisement segments falling within the location range of said advertisement could then be removed from the trick content.

Figure 9:
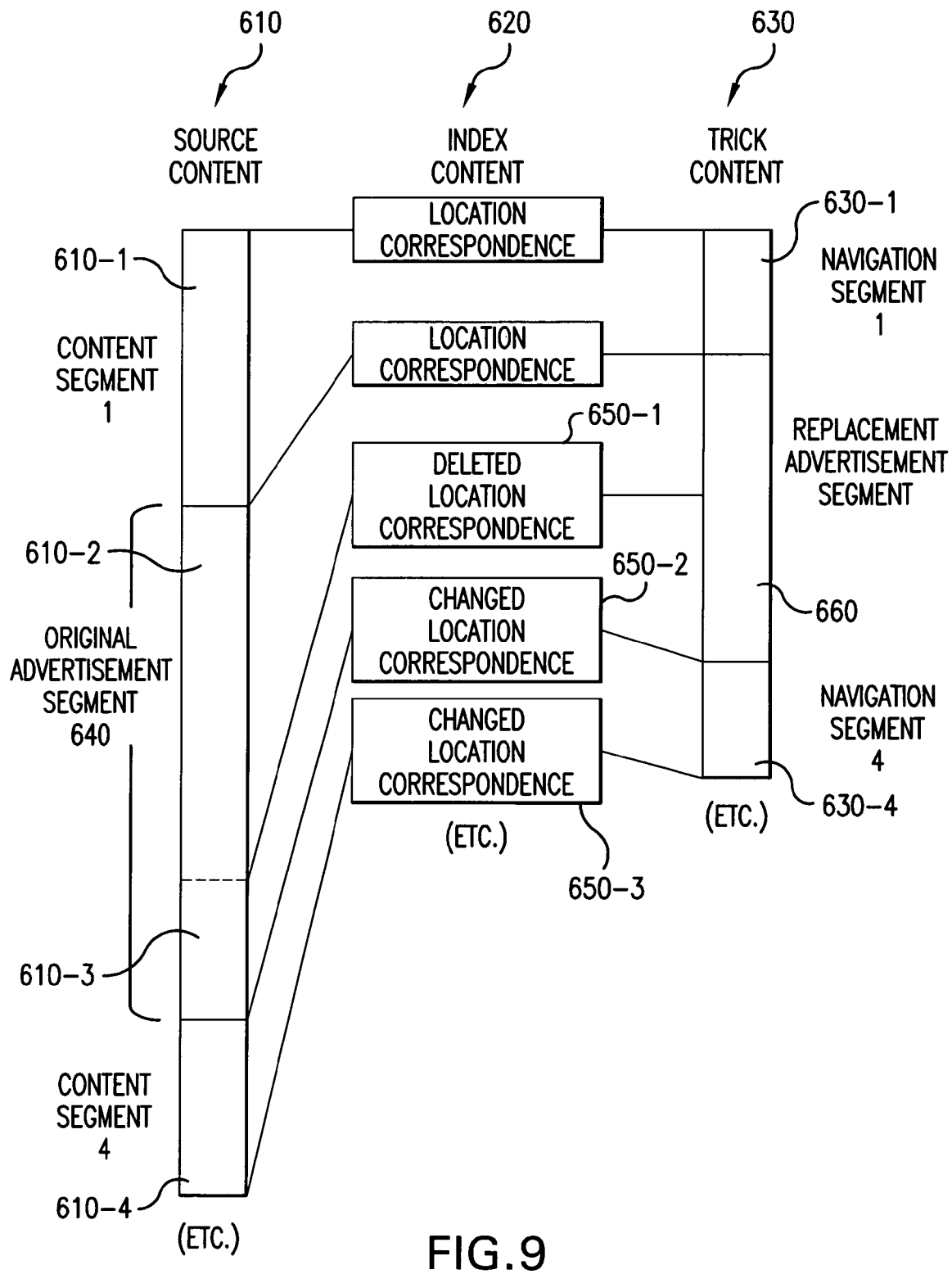
FIG. 9 illustrates content correspondence with ad replacement in accordance with some embodiments of the present invention.

An example of replacing an advertisement is illustrated in FIG. 9. The advertisement content detector/extractor unit 550 identifies the second content segment 610-2 and the third content segment 610-3 as an advertisement segment 640. The location range of the identified advertisement segment 640 in the source content is determined to encompass the second navigation segment 630-2 (FIG. 3) and the third navigation segment 630-3 (FIG. 3), so these navigation segments are removed from the trick content 630. The second location correspondence from the source content 610 is then replaced with an identical location correspondence that references the replacement advertisement content 660. Consequently, the location correspondence that references the third content segment 610-3 is removed altogether since no advertisement or navigation segments with that source content location remain.

The subsequent navigation segments within the trick content locations are modified to accommodate the removal of the third navigation segment 630-3 (FIG. 3) due to the difference in size between the replacement advertisement segment's content. It should be noted that the replacement advertisement segment 660 may be authored by a different entity than the original advertisement segment 640, which is more suitable for placement within the trick content. Furthermore, the replacement advertisement segment 660 may be an entirely different piece of content, or a differently authored version of the same to provide full advertisement replacement instead of reformatting the advertisement content to fit within the trick content 630.

Figure 10:
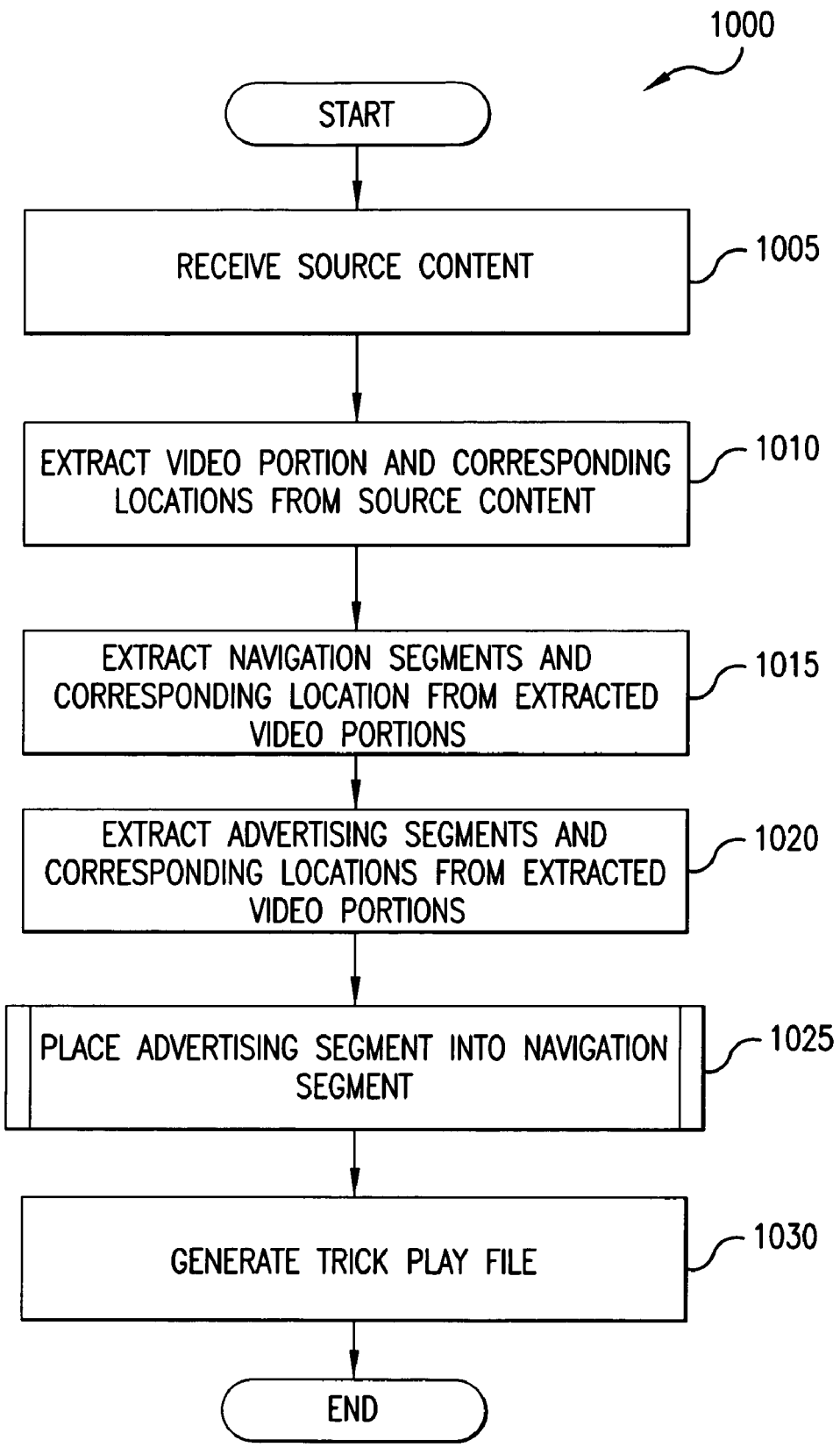
FIG. 10 is a logic flow diagram illustrating a routine for generating a trick content with advertisement content in accordance with some embodiments of the present invention.

FIG. 10 illustrates a routine 1000 for placing advertisements into trick content. Routine 1000 begins at 1005 in which source content is received at the trick content generator 500 from the content receiver 130. At 1010, the source is passed through the video extractor unit 510, where the video portions are identified and extracted from the source content. Additionally, the location of each video portion within the source content is recorded and associated with its corresponding video content.

At 1015, the video portions and their corresponding locations within the original source content are passed to the navigation segment extractor unit 515, in which the navigation segments are extracted from the video portions. Typically, the navigation segments may contain only a part of the content contained in the video portions, as described above. Furthermore, the navigation segments may contain either program content or advertisements, as the navigation segment extractor unit 515 may not differentiate between program content and advertisements. Navigation segments derived from advertisements are referred to as advertisement segments. Again, the location of each of the navigation segments and advertisement segments within the source content are noted and associated with the appropriate navigation segments and advertisement segments.

At 1020, the video portions and their corresponding locations within the original source content are passed to the advertisement detector/extractor unit 550. The advertisement detector/extractor unit 550 may identify and extract the entire advertisement and record the corresponding locations associated with those video portions that contain an advertisement. The extraction of the advertisement may occur in parallel with the extraction of the program content. In another embodiment, the extraction of the advertisements from the program content may be performed sequentially after the navigation segments have been extracted.

Next, at 1025, the advertisements along with their relative locations and the navigation/advertisement segments along with their relative locations may then be passed to the navigation content editor unit 555. The advertisements may then be merged with the navigation/advertisement segments with their corresponding source content locations preserved to form the navigation content. Finally, at 1030, the resultant navigation content may be passed to the restamper/remultiplexer unit 520, where it may be converted to a trick file.

Figure 11:
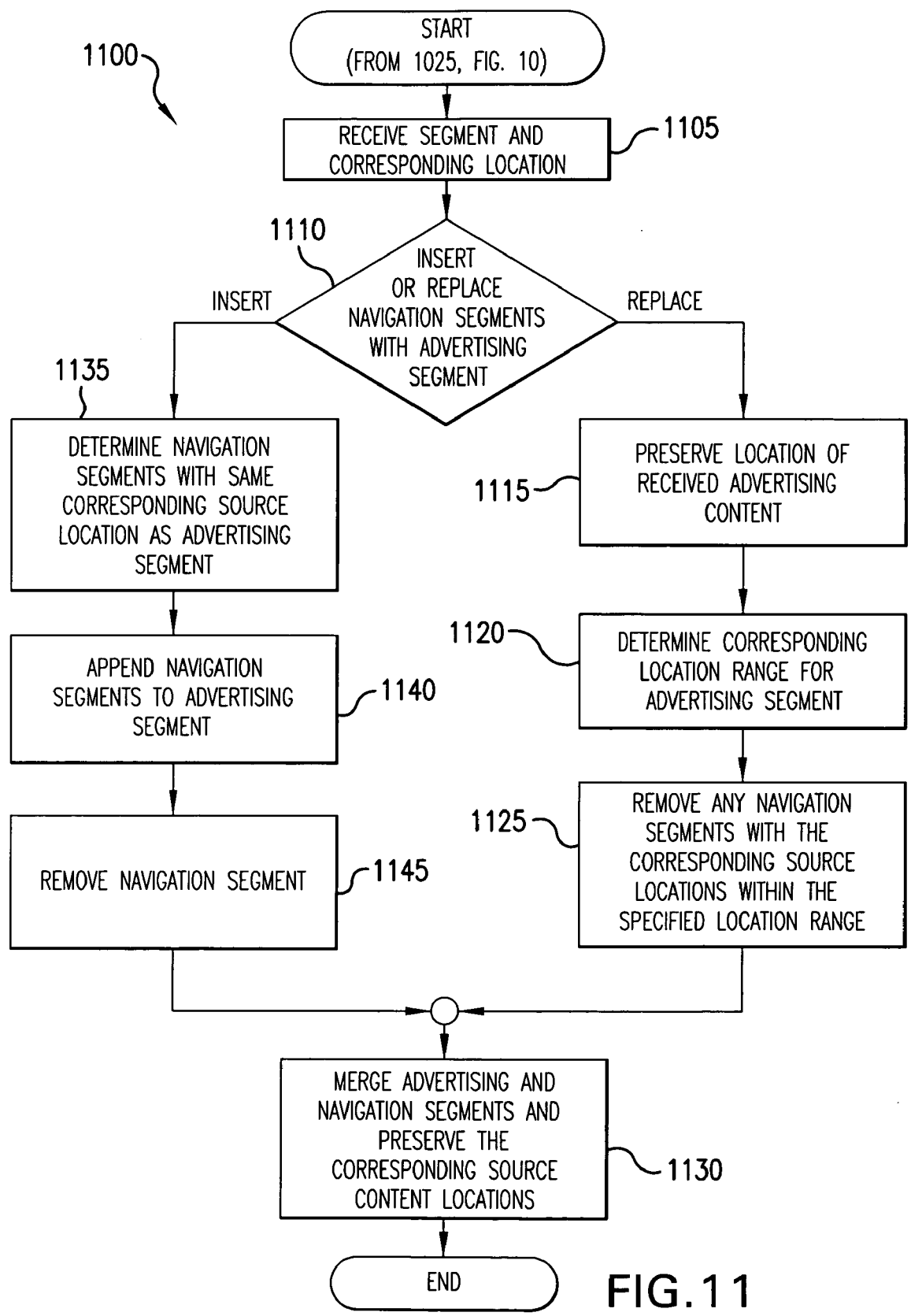
FIG. 11 is a logic flow diagram illustrating a routine for adding advertisement content to a trick content in a navigation content editor in accordance with some embodiments of the present invention.

FIG. 11 illustrates routine 1100 from 1025 of FIG. 10 for adding advertisements to trick content in a navigation content editor. Routine 1100 begins at 1105, where the extracted navigation segments and locations are received, as well as the extracted advertising segments and locations. Next, at 1110, the determination is made whether the original advertisement should be replaced with an alternative advertisement by the navigation content editor 555. For example, it may be desirable in some instances to replace the original advertisement with an advertisement that appears to be displayed at a different speed or an advertisement displayed in a changed direction. Additionally, this routine illustrates insertion of specialized versions of the advertisement, and/or inserting user or session specific advertisements.

If the determination is made to replace the original advertisement with an alternative advertisement, the "REPLACE" branch is followed to 1115, in which the corresponding location of the advertisement is preserved. Alternatively, if at 1110 the determination is made that the advertisement should not be replaced, the original advertisement is left unaltered and the "INSERT" branch is followed to 1135.

At 1110, a determination is made for each advertisement whether to insert the advertisement into the navigation/advertisement segments, or replace the advertisement segment that has the same corresponding location with the advertisement. If the determination is made to replace the navigation segment with the advertisement, then the, method continues from step 1115 to step 1120, in which the corresponding location range for the advertisement associated with the advertisement segment is determined 1120. Typically, the advertisement will have a specific length. Thus, the location range may be defined as the corresponding location of the advertisement within the source content. For example, if the key segment for an advertisement begins at the $30^{th}$ frame of the source content and the advertisement occupies the next 44 frames, then the location range would be defined to extend from frame 30, which is the keyframe of the advertisement, to frame 74, which is the end of the advertisement. However, if the advertisement does not include a length, but only corresponding source location, the length may be inferred form the properties of the advertisement, such as data size and bit rate.

At 1125, once the location range of the advertisement has been determined 1120, any advertisement segments may be removed if their corresponding locations are within the range corresponding to the advertisement. Finally at 1135, the advertisement and the remaining navigation segments are merged together. The advertisement and the navigation segments are then sorted by their corresponding location within the source content in ascending order to form the trick content.

Returning to 1110, if the determination is made that the advertisement is to be inserted into the trick content, then the "INSERT" branch is followed to 1135, in which the navigation/advertisement segments with the same corresponding locations as the advertisement are identified.

At 1140, the navigation segments are appended to the corresponding advertising segment At 1145, the navigation segment is deleted, since it is now represented by the advertisement segment. Steps 1135 through 1145 may be repeated for each advertisement within the video portion. Finally, at 1130 after all of the advertisements have been inserted, the advertisements and the navigation segments are merged and sorted by their corresponding location within the source content in ascending order to create trick content, which allows the trick content to be played in the forward direction. Additionally, the advertisement and the navigation segments may be merged together and sorted in descending order to crate trick content that may be played during rewind functionality of the VOD system.

It should be understood that the foregoing description and accompanying drawings are by example only. A variety of modifications are envisioned that do not depart from the scope and spirit of the invention.

The above description is intended by way of example only and is not intended to limit the present invention in any way.

Whereas the present invention has been described in detail it is understood that variations and modifications can be effected within the spirit and scope of the invention, as described herein before and as defined in the appended claims. The corresponding structures, materials, acts, and equivalents of all mean-plus-function elements, if any, in the claims below are intended to include any structure, material, or acts for performing the functions in combination with other claimed elements as specifically claimed.

Other alternative embodiments will become apparent to those skilled in the art to which an exemplary embodiment pertains without departing from its spirit and scope. Accordingly, the scope of the present invention is defined by the appended claims rather than the foregoing description.

We claim:

1. A method for generating trick content, comprising:
   extracting, with a video extractor unit, a plurality of video portions from source content, wherein each video portion comprises either program content or two or more original advertisements;
   extracting, with a navigation extractor unit, a navigation segment from each video portion;
   extracting, with an advertisement extractor unit, the two or more original advertisements from the source content containing advertisement content;
   replacing at least one, but not all, of the two or more original advertisements with an alternative advertisement;
   combining, with a navigation content editor, the two or more original advertisements and the navigation segments extracted from the source content into trick content, wherein the original advertisements are configured to appear to playback at an original playback speed and the navigation segments are configured to appear to playback at a different apparent playback speed; and
   restamping, with a restamping unit, the trick content.

2. The method of claim 1, wherein the extracting of the one or more original advertisements comprises extracting the one or more advertisements from the video portions containing advertisement content.

3. The method of claim 1, further comprising: identifying the navigation segments extracted from the one or more original advertisements; and removing the navigation segments extracted from the one or more original advertisements.

4. The method of claim 1, wherein the alternative advertisement comprises the video portions of the alternative advertisement.

5. The method of claim 1, wherein the alternative advertisement comprises the audio portions of the alternative advertisement.

6. The method of claim 1, wherein the alternative advertisement comprises an audio advertisement.

7. The method of claim 1, wherein the alternative advertisement comprises an advertisement that appears to be displayed at a different speed than the trick content associated with the program content.

8. The method of claim 1, wherein the alternative content comprises content that may appear to be played in a direction opposite to the direction of trick content associated with the program content.

9. The method of claim 1, wherein the alternative advertisement comprises a barker video.

10. The method of claim 1, wherein the alternative advertisement comprises an advertisement directed to a specific premises device.

11. The method of claim 1, further comprising remultiplexing the one or more original advertisements and the navigation segments to generate a trick file.

12. The method of claim 3, further comprising remultiplexing the one or more advertisements and the navigation segments to generate a trick file.

13. The method of claim 1, further comprising remultiplexing the one or more original advertisements and the navigation segments to generate a trick file.

14. The method of claim 1, wherein combining the one or more original advertisements with the navigation segments comprises: preserving the location in the source content of each navigation segment extracted from the one or more original advertisements; determining a corresponding location range for each advertisement; removing each navigation segment that has the same corresponding locations within the source content as the location range of each advertisement; and merging the one or more original advertisements and the remaining navigation segments to form the trick content.

15. The method of claim 14, wherein the extracting the one or more advertisements comprises extracting the one or more advertisements from the video portions containing advertisement content.

16. The method of claim 14, wherein the alternative advertisement comprises an advertisement that appears to be displayed at a different speed than the trick content associated with the program content.

17. The method of claim 14, wherein the alternative advertisement comprises content that may appear to be displayed in a direction opposite to the direction of the trick content associated with the program content.

18. The method of claim 14, wherein the alternative advertisement comprises a barker video.

19. The method of claim 14, wherein the alternative advertisement comprises an advertisement directed to a specific premises device.

20. The method of claim 14, further comprising remultiplexing the one or more original advertisements and the navigation segments to generate a trick file.

21. The method of claim 14, wherein the alternative advertisement comprises the video portions of the alternative advertisement.

22. The method of claim 14, wherein the alternative advertisement comprises the audio portions of the alternative advertisement.

23. The method of claim 14, wherein the alternative advertisement comprises an audio advertisement.

24. The method of claim 14, further comprising remultiplexing the one or more original advertisements and the navigation segments to generate a trick file.

25. The method of claim 14, wherein merging the one or more original advertisements and the remaining navigation segments comprises sorting the advertisements and the remaining navigation segments by their corresponding location in ascending order.

26. The method of claim 14, wherein merging the one or more original advertisements and the remaining navigation segments comprises sorting the advertisements and the remaining navigation segments by their corresponding location in descending order.

27. The method of claim 1, wherein combining the one or more original advertisements with the navigation segments comprises: determining the navigation segments with the same corresponding locations as the one or more original advertisements; appending each advertisement to the first navigation segment with the same corresponding location in the source content; removing the navigation segments with the same corresponding location in the source content as the advertisement; and merging the one or more original advertisements and the remaining navigation segments to form the trick content.

28. The method of claim 27, wherein merging the advertisement and the remaining navigation segments comprises sorting the advertisements and the remaining navigation segments by their corresponding location in ascending order.

29. The method of claim 27, wherein merging the advertisement and the remaining navigation segments comprises sorting the advertisements and the remaining navigation segments by their corresponding location in descending order.

30. The method of claim 27, wherein determining the navigation segments with the same corresponding location as the advertisement, comprises: calculating a location range of the advertisement; comparing the location of the navigation segments within the source content to the calculated location range for the advertisement; and removing the navigation segments whose location lies within the calculated location range.

31. The method of claim 30, wherein calculating the location range comprises: determining the corresponding location of the advertisement within the source content; determining whether an advertisement contains a value corresponding to a length of the advertisement within the source content; adding the length to the corresponding location if the advertisement contains a value indicating the length; and calculating the length of the advertisement within the source content.

32. The method of claim 31, wherein calculating the length, comprises inferring the length from the bit rate of the advertisement if the advertisement does not contains a value indicating the length.

33. The method of claim 31, wherein calculating the length, comprises inferring the length from the data size of the advertisement.

34. A method for generating trick content, comprising:
extracting with a video extractor unit a plurality of video portions from source content, wherein each video portion comprises either program content or two or more original advertisements;

extracting with a navigation extractor unit a navigation segment from each video portion comprising program content;

extracting with an advertisement extractor unit the two or more original advertisements from the source content containing advertisement content;

replacing a portion of the original advertisements with an alternative advertisement;

combining with a navigation content editor the two or more original advertisements extracted from the source content and the navigation segments into trick content, wherein the original advertisements are configured to appear to playback at an original playback speed and the navigation segments are configured to appear to playback at a different apparent playback speed; and restamping with a restamping unit the trick content.

35. The method of claim 34, wherein the one or more original advertisements comprises the video portion of the advertisement.

36. The method of claim 34, wherein the alternative advertisement comprises an advertisement that appears to be displayed at a different speed than the trick content associated with the program content.

37. The method of claim 34, wherein the alternative content comprises content that may appear to be played in a direction opposite to the direction of trick content associated with the program content.

38. The method of claim 34, wherein the alternative advertisement comprises a barker video.

39. The method of claim 34, wherein the alternative advertisement comprises an advertisement directed to a specific premises device.

40. The method of claim 34, further comprising remultiplexing the one or more original advertisements and the navigation segments to generate a trick file.

41. The method of claim 34, wherein the alternative advertisement comprises the video portions of the alternative advertisement.

42. The method of claim 34, wherein the alternative advertisement comprises the audio portions of the alternative advertisement.

43. The method of claim 34, wherein the alternative advertisement comprises an audio advertisement.

44. The method of claim 34, further comprising remultiplexing the one or more original advertisements and the navigation segments to generate a trick file.

45. The method of claim 34, wherein combining the one or more original advertisements and the navigation segments comprises sorting the one or more original advertisements and the remaining navigation segments by their corresponding location in ascending order.

46. The method of claim 35, wherein combining the one or more original advertisements and the navigation segments comprises sorting the one or more original advertisements and the remaining navigation segments by their corresponding location in descending order.

47. An apparatus, comprising:

a video extractor unit operable for extracting a plurality of video portions from source content, wherein each video portion comprises either program content or two or more original advertisements;

a navigation segment extractor unit operable for extracting a navigation segment from each video portion;

an advertisement detector/extractor unit operable for extracting the two or more original advertisements from the source content containing advertisement content;

a navigation content editor unit operable for combining the two or more original advertisements extracted from the source content and the navigation segments into trick content, wherein the original advertisements are configured to appear to playback at an original playback speed and the navigation segments are configured to appear to playback at a different apparent playback speed, wherein the navigation content editor is further operable for replacing at least one, but not all, of the two or more original advertisements with an alternative advertisement; and a restamping/remultiplexing unit operable for restamping the trick content.

48. The apparatus of claim 47, wherein the advertisement detector/extractor unit is further operable for extracting one or more original advertisements from the video portions containing advertisement content.

49. The apparatus of claim 47 wherein the navigation content editor unit is further operable for: identifying the navigation segments extracted from the one or more original advertisements; and removing the navigation segments extracted from the one or more original advertisements.

50. The apparatus of claim 47, wherein the alternative advertisement comprises the video portions of the alternative advertisement.

51. The apparatus of claim 47, wherein the alternative advertisement comprises the audio portions of the alternative advertisement.

52. The apparatus of claim 47, wherein the alternative advertisement comprises an audio advertisement.

53. The apparatus of claim 47, wherein the alternative advertisement comprises an advertisement that appears to be displayed at a different speed than the trick content associated with the program content.

54. The apparatus of claim 47, wherein the alternative advertisement comprises content that may appear to be played in a direction opposite to the direction of trick content associated with the program content.

55. The apparatus of claim 47, wherein the alternative advertisement comprises a barker video.

56. The apparatus of claim 47, wherein the alternative advertisement comprises content directed to a specific premises device.

57. The apparatus of claim 47, wherein restamper/remultiplexer unit is further operable for remultiplexing the one or more original advertisements and the navigation segments to generate a trick file.

58. The apparatus of claim 49, wherein restamper/remultiplexer unit is further operable for remultiplexing the one or more original advertisements and the navigation segments to generate a trick file.

59. The apparatus of claim 47, wherein restamper/remultiplexer unit is further operable for remultiplexing the one or more original advertisements and the navigation segments to generate a trick file.

60. The apparatus of claim 47, wherein combining the one or more original advertisements with the navigation segments comprises: preserving the location in the source content of each navigation segment extracted from the one or more original advertisements; determining a corresponding location range for each advertisement; removing each navigation segment that has the same corresponding locations within the source content as the location range of each advertisement; and merging the one or more original advertisements and the remaining navigation segments to form the trick content.

61. The apparatus of claim 59, wherein the advertisement detector/extractor unit is further operable for extracting one or more original advertisements from the video portions containing advertisement content.

62. The apparatus of claim 59, wherein the alternative advertisement comprises an advertisement that appears to be displayed at a different speed than the trick content associated with the program content.

63. The apparatus of claim 59, wherein the alternative advertisement comprises content that may appear to be displayed in a direction opposite to the direction of the trick content associated with the program content.

64. The apparatus of claim 59, wherein the alternative advertisement comprises a barker video.

65. The apparatus of claim 59, wherein the alternative advertisement comprises an advertisement directed to a specific premises device.

66. The apparatus of claim 59, further comprising remultiplexing the one or more original advertisements and the navigation segments to generate a trick file.

67. The apparatus of claim 59, wherein the alternative advertisement comprises the video portions of the alternative advertisement.

68. The apparatus of claim 59, wherein the alternative advertisement comprises the audio portions of the alternative advertisement.

69. The apparatus of claim 59, wherein the alternative advertisement comprises an audio advertisement.

70. The apparatus of claim 60, wherein the restamper/remultiplexer unit is further operable for remultiplexing the one or more original advertisements and the navigation segments to generate a trick file.

71. The apparatus of claim 60, wherein merging the one or more original advertisements and the remaining navigation segments comprises sorting the advertisements and the remaining navigation segments by their corresponding location in ascending order.

72. The apparatus of claim 60, wherein merging the one or more original advertisements and the remaining navigation segments comprises sorting the advertisements and the remaining navigation segments by their corresponding location in descending order.

73. The apparatus of claim 47, wherein combining the one or more original advertisements with the navigation segments comprises: determining the navigation segments with the same corresponding locations as the one or more original advertisements; appending each advertisement to the first navigation segment with the same corresponding location in the source content; removing the navigation segments with the same corresponding location in the source content as the advertisement; and merging the one or more original advertisements and the remaining navigation segments to form the trick content.

74. The apparatus of claim 73, wherein merging the advertisement and the remaining navigation segments comprises sorting the advertisements and the remaining navigation segments by their corresponding location in ascending order.

75. The apparatus of claim 73, wherein merging the advertisement and the remaining navigation segments comprises sorting the advertisements and the remaining navigation segments by their corresponding location in descending order.

76. The apparatus of claim 73, wherein determining the navigation segments with the same corresponding location as the advertisement, comprises: calculating a location range of the advertisement; comparing the location of the navigation segments within the source content to the calculated location range for the advertisement; and removing the navigation segments whose location lies within the calculated location range.

77. The apparatus of claim 76, wherein calculating the location range comprises: determining the corresponding location of the advertisement within the source content; determining whether an advertisement contains a value corresponding to a length of the advertisement within the source content; adding the length to the corresponding location if the advertisement contains a value indicating the length; and calculating the length of the advertisement within the source content.

78. The apparatus of claim 76, wherein calculating the length, comprises inferring the length from the bit rate of the advertisement if the advertisement does not contains a value indicating the length.

79. The apparatus of claim 77, wherein calculating the length, comprises inferring the length from the data size of the advertisement.

80. An apparatus, comprising:
a video extractor unit operable for extracting a plurality of video portions from source content, wherein each video portion comprises either program content or two or more original advertisements;
a navigation segment extractor unit operable for extracting a navigation segment from each video portion comprising program content;
an advertisement detector/extractor unit operable for extracting the two or more original advertisements from the source content containing advertisement content;
a navigation content editor unit operable for combining the two or more original advertisements extracted from the source content and the navigation segments into trick content, wherein the original advertisements are configured to appear to playback at an original playback speed and the navigation segments are configured to appear to playback at a different apparent playback speed, wherein the navigation content editor is further operable for replacing a portion of the advertisements with an alternative advertisement; and
a restamping/remultiplexing unit operable for restamping the trick content.

81. The apparatus of claim 80, wherein the advertisement detector/extractor unit is further operable for extracting one or more original advertisements from the video portions containing advertisement content.

82. The apparatus of claim 80, wherein the alternative advertisement comprises an advertisement that appears to be displayed at a different speed than the trick content associated with the program content.

83. The apparatus of claim 80, wherein the alternative content comprises content that may appear to be played in a direction opposite to the direction of trick content associated with the program content.

84. The apparatus of claim 80, wherein the alternative advertisement comprises a barker video.

85. The apparatus of claim 80, wherein the alternative advertisement comprises an advertisement directed to a specific premises device.

86. The apparatus of claim 80, wherein the restamper/remultiplexer unit is further operable for remultiplexing the one or more original advertisements and the navigation segments to generate a trick file.

87. The apparatus of claim 80, wherein the alternative advertisement comprises the video portions of the alternative advertisement.

88. The apparatus of claim 80, wherein the alternative advertisement comprises the audio portions of the alternative advertisement.

89. The apparatus of claim 80, wherein the alternative advertisement comprises an audio advertisement.

90. The apparatus of claim 80, wherein the restamper/remultiplexer unit is further operable for remultiplexing the one or more original advertisements and the navigation segments to generate a trick file.

91. The apparatus of claim 80, wherein combining the one or more original advertisements and the navigation segments comprises sorting the one or more original advertisement and the remaining navigation segments by their corresponding location in ascending order.

92. The apparatus of claim 80, wherein combining the one or more original advertisements and the navigation segments comprises sorting the one or more original advertisements and the remaining navigation segments by their corresponding location in descending order.

93. A system, comprising:
a content receiver operable for receiving source content;
a content manager, comprising:
 a video extractor unit operable for extracting a plurality of video portions from the source content, wherein each video portion contains either program content or two or more original advertisements;
 a navigation segment extractor unit operable for extracting a navigation segment from each video portion;
 an advertisement detector/extractor unit for:
  identifying source content comprising two or more original advertisements; and
  extracting the one or more original advertisements from the source content;
 a navigation content editor unit operable for merging the two or more original advertisements extracted from the source content and navigation segments into trick content, wherein the original advertisements are configured to appear to playback at an original playback speed and the navigation segments are configured to appear to playback at a different apparent playback speed, the navigation content editor further being operable for replacing at least one of the one or more, but not all, original advertisements with an alternative advertisement;
 a restamper/remultiplexer unit operable for restamping the trick content into a trick content; and
 a plurality of content storage devices operable for storing the trick content.

94. The apparatus of claim 93, wherein the advertisement detector/extractor unit is further operable for extracting one or more original advertisements from the video portions containing advertisement content.

95. The system of claim 93, further comprising: a plurality of video streaming engines for streaming the trick content stored on the plurality of content storage devices over a distributed network; and a plurality of premises devices operable for receiving the trick content over the distributed network and displaying the trick content at a user site.

96. The system of claim 93, wherein the navigation content editor is further operable for: identifying the navigation segments extracted from the one or more original advertisements; and removing the navigation segments extracted from the one or more original advertisements.

97. The system of claim 93, wherein the alternative advertisement comprises an advertisement that appears to be displayed at a different speed than the trick content associated with the program content.

98. The system of claim 93, wherein the alternative content comprises content that may appear to be played in a direction opposite to the direction of trick content associated with the program content.

99. The system of claim 93, wherein the alternative advertisement comprises a barker video.

100. The system of claim 93, wherein the alternative advertisement comprises an advertisement directed to a specific premises device.

101. The system of claim 97, further comprising remultiplexing the one or more advertisement and the navigation segments to generate a trick file.

102. The apparatus of claim 97, wherein the alternative advertisement comprises the video portions of the alternative advertisement.

103. The apparatus of claim 97, wherein the alternative advertisement comprises the audio portions of the alternative advertisement.

104. The apparatus of claim 97, wherein the alternative advertisement comprises an audio advertisement.

105. The system of claim 95, wherein the restamper/remultiplexer unit further is further operable for remultiplexing the one or more advertisements and the navigation segments to generate a trick file.

106. The system of claim 93, wherein the restamper/remultiplexer unit is further operable for remultiplexing the one or more original advertisements and the navigation segments to generate a trick file.

107. The system of claim 93, wherein combining the one or more original advertisements with the navigation segments comprises: preserving the location in the source content of each navigation segment extracted from the one or more original advertisements; determining a corresponding location range for each advertisement; removing each navigation segment that has the same corresponding locations within the source content as the location range of each advertisement; and merging the one or more original advertisements and the remaining navigation segments to form the trick content.

108. The system of claim 107, wherein the advertisement detector/extractor unit is further operable for extracting one or more original advertisements from the video portions containing advertisement content.

109. The system of claim 107, wherein the alternative advertisement comprises an advertisement that appears to be displayed at a different speed than the trick content associated with the program content.

110. The system of claim 107, wherein the alternative advertisement comprises content that may appear to be displayed in a direction opposite to the direction of the trick content associated with the program content.

111. The system of claim 107, wherein the alternative advertisement comprises a barker video.

112. The system of claim 107, wherein the alternative advertisement comprises an advertisement directed to a specific premises device.

113. The system of claim 107, wherein the restamper/remultiplexer unit is further operable for remultiplexing the one or more original advertisements and the navigation segments to generate a trick file.

114. The system of claim 107, wherein the alternative advertisement comprises the video portions of the alternative advertisement.

115. The system of claim 107, wherein the alternative advertisement comprises the audio portions of the alternative advertisement.

116. The system of claim 107, wherein the alternative advertisement comprises an audio advertisement.

117. The system of claim 107, wherein the restamper/remultiplexer unit is further operable for remultiplexing the one or more original advertisements and the navigation segments to generate a trick file.

118. The system of claim 107, wherein merging the one or more original advertisements and the remaining navigation segments comprises sorting the advertisements and the remaining navigation segments by their corresponding location in ascending order.

119. The system of claim 107, wherein merging the one or more original advertisements and the remaining navigation segments comprises sorting the advertisements and the remaining navigation segments by their corresponding location in descending order.

120. The system of claim 93, wherein combining the one or more original advertisements with the navigation segments comprises: determining the navigation segments with the same corresponding locations as the one or more original advertisements; appending each advertisement to the first navigation segment with the same corresponding location in the source content; removing the navigation segments with the same corresponding location in the source content as the advertisement; and merging the one or more original advertisements and the remaining navigation segments to form the trick content.

121. The system of claim 120, wherein merging the advertisement and the remaining navigation segments comprises sorting the advertisements and the remaining navigation segments by their corresponding location in ascending order.

122. The system of claim 120, wherein merging the advertisement and the remaining navigation segments comprises sorting the advertisements and the remaining navigation segments by their corresponding location in descending order.

123. The system of claim 120, wherein determining the navigation segments with the same corresponding location as the advertisement, comprises: calculating a location range of the advertisement; comparing the location of the navigation segments within the source content to the calculated location range for the advertisement; and removing the navigation segments whose location lies within the calculated location range.

124. The system of claim 123, wherein calculating the location range comprises: determining the corresponding location of the advertisement within the source content; determining whether an advertisement contains a value corresponding to a length of the advertisement within the source content; adding the length to the corresponding location if the advertisement contains a value indicating the length; and calculating the length of the advertisement within the source content.

125. The system of claim 124, wherein calculating the length, comprises inferring the length from the bit rate of the advertisement if the advertisement does not contains a value indicating the length.

126. The system of claim 124, wherein calculating the length, comprises inferring the length from the data size of the advertisement.

127. An apparatus, comprising:
 a video extractor unit operable for extracting a plurality of video portions from source content, wherein each video portion comprises either program content or two or more original advertisements;
 a navigation segment extractor unit operable for extracting a navigation segment from each video portion comprising program content;
 an advertisement detector/extractor unit operable for extracting the two or more original advertisements from the source content containing advertisement content;
 a navigation content editor unit operable for combining the two or more original advertisements extracted from the source content and the navigation segments into trick content, wherein the original advertisements are configured to appear to playback at an original playback speed and the navigation segments are configured to appear to playback at a different apparent playback speed, and replacing a portion of the advertisements with an alternative advertisement; and
 a restamping/remultiplexing unit operable for restamping the trick content.

128. The apparatus of claim 127, wherein the advertisement detector/extractor unit is further operable for extracting one or more advertisements from the video portions containing advertisement content.

129. The apparatus of claim 127, wherein the alternative advertisement comprises an advertisement that appears to be displayed at a different speed than the trick content associated with the program content.

130. The apparatus of claim 127, wherein the alternative content comprises content that may appear to be played in a direction opposite to the direction of trick content associated with the program content.

131. The apparatus of claim 127, wherein the alternative advertisement comprises a barker video.

132. The apparatus of claim 127, wherein the alternative advertisement comprises an advertisement directed to a specific premises device.

133. The apparatus of claim 127, wherein the restamper/remultiplexer unit is further operable for remultiplexing the one or more original advertisements and the navigation segments to generate a trick file.

134. The apparatus of claim 127, wherein the alternative advertisement comprises the video portions of the alternative advertisement.

135. The apparatus of claim 127, wherein the alternative advertisement comprises the audio portions of the alternative advertisement.

136. The apparatus of claim 127, wherein the alternative advertisement comprises an audio advertisement.

137. The apparatus of claim 127, wherein the restamper/remultiplexer unit is further operable for remultiplexing the one or more original advertisements and the navigation segments to generate a trick file.

138. The apparatus of claim 127, wherein combining the one or more original advertisements and the navigation segments comprises sorting the one or more original advertisements and the remaining navigation segments by their corresponding location in ascending order.

139. The apparatus of claim 127, wherein combining the one or more original advertisements and the navigation segments comprises sorting the one or more original advertisements and the remaining navigation segments by their corresponding location in descending order.

* * * * *